United States Patent
Byon

[19]

[11] Patent Number: 5,847,472
[45] Date of Patent: Dec. 8, 1998

[54] METHOD FOR RECORDING AN OPERATION TIME OF AN AIR BAG SYSTEM AND AN APPARATUS FOR PERFORMING THE SAME

[75] Inventor: Sung-Kwang Byon, Seoul, Rep. of Korea

[73] Assignee: Daewoo Electronics Co., Ltd., Seoul, Rep. of Korea

[21] Appl. No.: 686,035

[22] Filed: Jul. 25, 1996

[30] Foreign Application Priority Data

Jul. 28, 1995 [KR] Rep. of Korea ................... 1995-22707

[51] Int. Cl.[6] .................................................. B60R 21/32
[52] U.S. Cl. .......................... 307/10.1; 180/282; 280/735; 340/436
[58] Field of Search ...................... 307/9.1, 10.1, 307/121; 340/669, 436, 438, 440; 280/734, 735, 727, 728.1; 180/271, 274, 282; 324/727, 527; 701/45–47

[56] References Cited

U.S. PATENT DOCUMENTS

| | | |
|---|---|---|
| 3,714,627 | 1/1973 | Dillman et al. . |
| 3,964,016 | 6/1976 | Yamada et al. . |
| 4,016,426 | 4/1977 | Nishioka ................................. 307/10.1 |
| 4,086,562 | 4/1978 | Hasegawa ............................... 280/735 |
| 4,992,943 | 2/1991 | McCracken .............................. 340/436 |
| 5,416,360 | 5/1995 | Huber et al. ............................ 307/10.1 |
| 5,581,464 | 12/1996 | Woll et al. ................................ 340/438 |
| 5,610,575 | 3/1997 | Gioutsos .................................. 340/436 |
| 5,631,834 | 5/1997 | Tsurushima et al. ................... 307/10.1 |
| 5,646,454 | 7/1997 | Mattes et al. ........................... 307/10.1 |

*Primary Examiner*—Richard T. Elms

[57] ABSTRACT

A method for recording the operation time of an air bag system and an apparatus for the recording the operation state and the operation time of each module of an air bag system at the moment of operation of an air bag system, are disclosed. Time is initialized, and then it is judged whether or not a collision sensing signal has been transmitted from a collision sensor. When the collision sensing signal has been transmitted, the collision sensing signal is compared with a preset point. When the collision sensing signal exceeds the preset point, a control circuit outputs a control signal to operate an air bag, and measuring the time. Next, whether or not the control signal has been normally transmitted is judged. When the control signal has not been normally transmitted, a first system error is recorded in a memory device. When the control signal has been normally transmitted, a transmission time of the control signal is recorded. Then, whether or not the air bag had normally expanded is judged. When the air bag has been normally expanded, a second system error is recorded in the memory device. When the air bag has not been normally expanded, an expansion time of the air bag is recorded. This air bag system secures the trust of the user by enabling the user to know after the air bag had been expanded whether or not the air bag modules correctly operated within the set time.

22 Claims, 7 Drawing Sheets

METHOD FOR RECORDING AN OPERATION TIME OF AN AIR BAG SYSTEM AND AN APPARATUS FOR PERFORMING THE SAME

BACKGROUND OF THE INVENTION

1. Field of the Invention

The present invention relates to a method for recording the operation state of an air bag system and an apparatus for performing the same, and more particularly to a method for recording the operation time of an air bag system and an apparatus for the recording the operation situation and the operation time of modules in an air bag system during the operation of an air bag system.

2. Description of the Prior Art

A variety of air bag apparatuses for motor vehicles have been proposed hitherto. An air bag system is an apparatus for protecting a passenger during a collision of the motor vehicle. The conventional air bag system for a motor vehicle generally has a collision sensing sensor for sensing the collision of the motor vehicle, a control circuit for controlling an operation of an air bag system by judging the collision by the sensing signal transmitted from the collision sensing sensor, and an air bag module for performing an operation to protect a passenger by receiving a control signal from the control circuit. The air bag module includes an inflatable air bag and an inflator for injecting a gas into the air bag to expand the air bag. The inflator includes a squib section for receiving a control signal from the control circuit and igniting, and a reaction device for generating the gas by the explosion after the ignition of the squib section.

Figure 5:
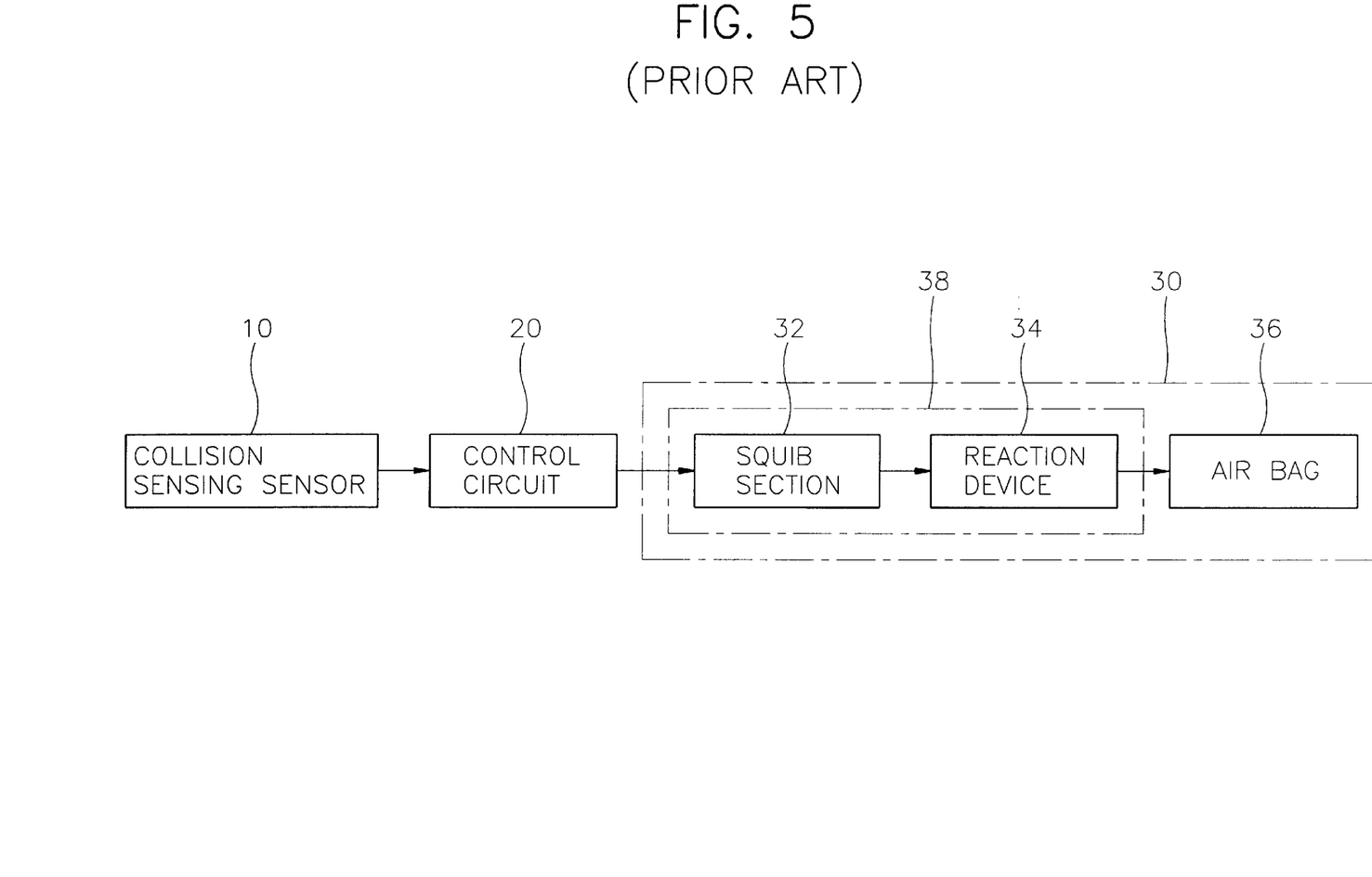
FIG. 5 illustrates the constitution of the conventional air bag apparatus.

FIG. 5 illustrates a schematic view of the constitution of the conventional air bag apparatus. As shown in FIG. 5, if a shock is applied to a car body by a collision with another vehicle or with an object while the vehicle is moving along a road, the vehicle's collision is monitored by a collision sensing sensor 10 mounted to a predetermined position on the vehicle. When collision sensing sensor 10 senses the shock, collision sensing sensor 10 generates the collision sensing signal and supplies it to a control circuit 20. Control circuit 20 decides whether or not the collision sensing signal received from collision sensor 10 exceeds a preset shock value required for inflating an air bag 36. If the collision sensing signal transmitted from collision sensing sensor 10 exceeds the preset shock value, control circuit 20 outputs an air bag expansion triggering signal to an air bag module 30. The air bag expansion triggering signal transmitted from control circuit 20 is applied to a squib section 32 in an inflator 38. Squib section 32 is ignited after receiving a control signal that is outputted from control circuit 20. When squib section 32 is ignited, a reaction device 34 generates an inert gas or an air such as nitrogen $N_2$ or argon Ar for injection into air bag 36 by an explosion. The gas generated at reaction device 34 is injected into air bag 36. Air bag 36 is instantaneously inflated by the gas injected by the inflator 38. Consequently, the passenger in the vehicle can be protected from colliding with a structural part of the vehicle by inflated air bag 36.

In the conventional air bag system operated as above, a module in the air bag system is complicatedly connected to another module. In order to protect the passenger during a collision of the motor vehicle, an air bag system must correctly operate within a set time from the sensing of the collision to the inflation the air bag. If the air bag system does not correctly operate within the set time, the manufacturing company of the air bag system is responsible for compensation for a passenger's injury.

However, after an air bag has expanded because of a collision of a motor vehicle, the passenger in the vehicle having the air bag system may have difficulty in judging whether or not the modules of the air bag system had correctly operated within the set time Consequently, except for the case when the air bag did not expand after collision of the motor vehicle the manufacturing company can be free from any responsibility for injuries. As a result, if the air bag did expand, then a passenger in a vehicle having an air bag system may not be compensated for injuries due to an air bag system that did not correctly operate within the set time because of the faults in the manufacturing of the air bag system. Thus, the conventional air bag system can not secure the trust to the user.

Figure 6:
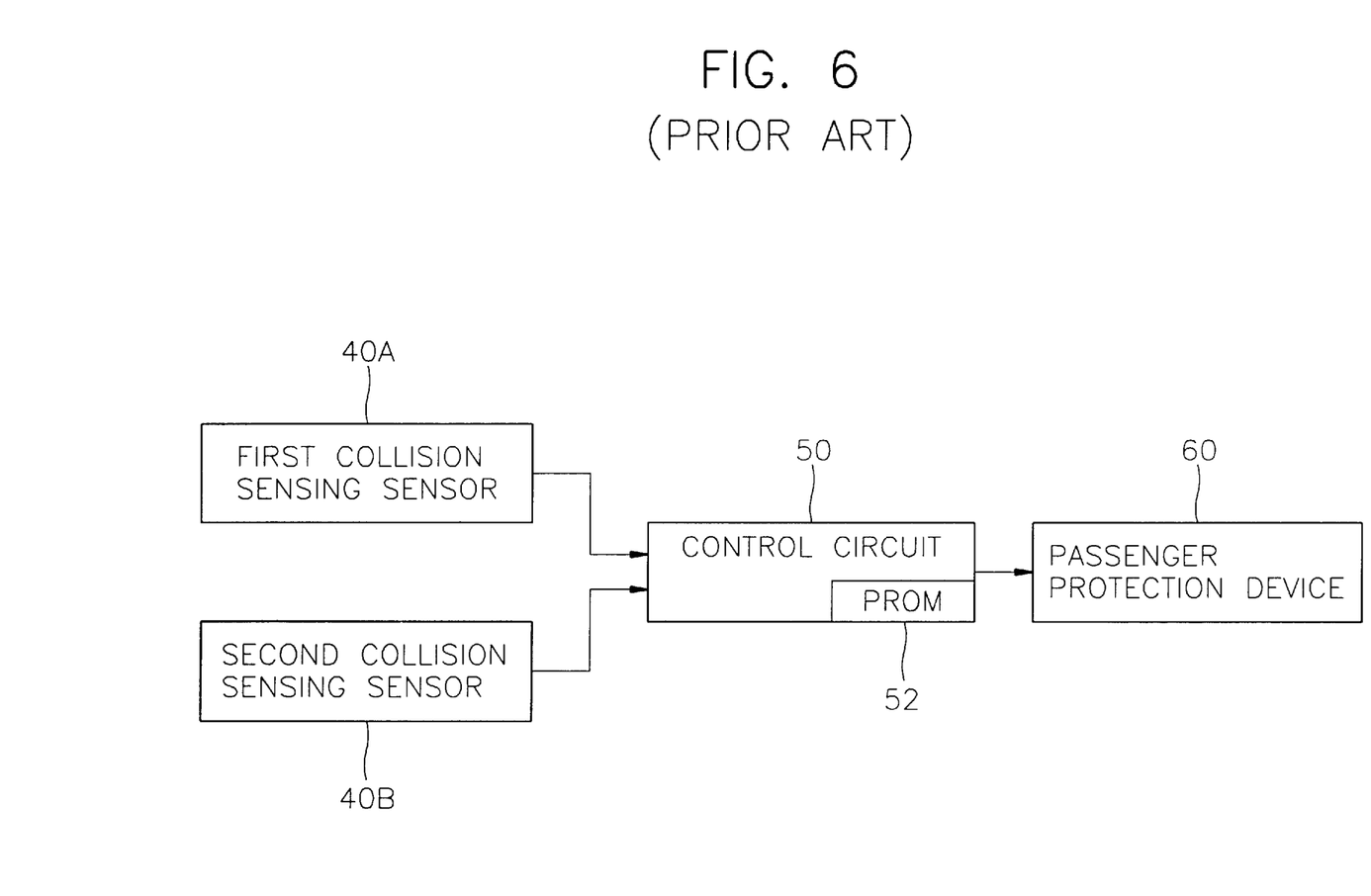
FIG. 6 illustrates the air bag system of the conventional air bag apparatus equipped with a plurality of the collision sensing sensors.

U.S. Pat. No. 5,416,360 (issued to Anton Huber et al. on May 16, 1995) discloses an air bag system which improves the user's trust in the system. FIG. 6 illustrates the air bag system disclosed in the above patent. Anton Huber's air bag system includes at least two collision sensing sensors, that is, first and second collision sensors which are connected to a control circuit which controls the operation of the air bag system. The control circuit includes a programmable read only memory and is electrically connected with the air bag module.

In Anton Huber's air bag system, first and second collision sensing sensors sense a collision which exceeds the preset shock value and programmable read only memory records the fact of the collision. Anton Huber's air bag system operates only if the collision sensing signal is transmitted from first and second collision sensing sensors. Namely, Anton Huber's air bag system does not operate in the case of a slight collision of the motor vehicle. Consequently, the trustworthiness of the air bag system is increased because it prevents an unwarranted operation of the air bag system.

Anton Huber's air bag system has an advantage of reducing the unwarranted operation of the air bag system. However, since the air bag system described in the Anton Huber's patent does not record the operation state and the operation time of the air bag system, the above-mentioned problem of securing the user's trust still remain.

SUMMARY OF THE INVENTION

Therefore, the present invention is contrived to solve the foregoing problem. The first object of the present invention is to provide a method for recording the operation state (or situation) and the operation time of an air bag system in order to obtain the trust of the user.

The second object of the present invention is to provide an air bag system for recording the operation state and the operation time of the above-described air bag system.

In order to achieve the first object, the present invention provides a method for recording an operation state and an operation time of an air bag system for a motor vehicle, the method comprising the steps of:

(i) setting a time to zero and judging whether or not a collision sensing signal is inputted;

(ii) comparing the collision sensing signal with a set point when the collision sensing signal has been inputted in step (i) and generating a control signal to operate an air bag while measuring the time of transmission of a collision sensing signal having a value greater than the set point;

(iii) judging whether or not the control signal has been normally generated;

(iv) recording a first system error to a memory section when the control signal has not been normally generated and recording a generated time of the control signal to the memory section when the control signal has been normally generated in step (iii);

(v) judging whether or not the air bag has been normally expanded; and (vi) recording a second system error to the memory section when the air bag has not normally expansion and recording an expanded time of the air bag to the memory section when the air bag has been normally expanded in step (v).

Preferably, the generated control signal is returned as an input signal to judge whether or not the control signal has been generated in step (iii). In step (v), a pressure level of a gas injected into the air bag is measured to judge whether or not the air bag has normally expanded in step (v).

The first object of the present invention may be accomplished by providing a method for recording an operation state and an operation time of an air bag system for a motor vehicle, the method comprising the steps of:

(i) setting a time to zero and judging whether or not a collision sensing signal is inputted;

(ii) comparing the collision sensing signal with a set point when the collision sensing signal has been inputted in step (i) and generating a control signal to operate an air bag while measuring the time of the transmission of a collision sensing signal having a value greater than the set point;

(iii) judging whether or not the control signal has been normally generated;

(iv) recording a first system error to a memory section when the control signal has not been normally generated and recording a generated time of the control signal when the control signal has been normally generated in step (iii);

(v) judging whether or not a gas to be injected into the air bag has normally generated;

(vi) recording a second system error to the memory section when the gas has not been normally generated and recording a generated time of the gas to the memory section when the gas has been normally generated in step (v);

(vii) judging whether or not the gas has been normally injected into the air bag;

(viii) recording a third system error to the memory section when the gas has not been normally injected into the air bag and recording an injection time of the gas when the gas has been normally injected into the air bag in step (vii);

(ix) judging whether or not the air bag had normally expanded; and (x) recording a fourth system error when the air bag had not normally expanded and recording an expanded time of the air bag when the air bag had normally expanded in step (ix).

At this time, the heat generated during generation of the gas is sensed to judge whether or not the gas to be injected into the air bag has been normally generated in step (v). Also, a variation of a pressure level of the gas to be injected is sensed to judge whether or not the gas has been normally injected into the air bag at step (vii).

In order to achieve the second object, the present invention provides, an air bag system for recording an operation state and an operation time of the modules of an air bag system for a motor vehicle, which comprises:

a collision sensing sensor for generating a collision sensing signal by sensing a collision of the motor vehicle;

an air bag module having an inflator including a squib section which ignites and a reaction device for generating a gas by exploding a powder by the ignition of the squib section, an inflatable air bag which inflates by the injection of the gas, and an air bag sensor which is provided at a predetermined position on the air bag, for sensing an expansion operation of the air bag and outputting an air bag expansion sensing signal;

a clock generating section for generating a clock signal to record time;

a control means for receiving the collision sensing signal, for generating a control signal for igniting the squib section, for judging whether or not the control signal has been transmitted by either receiving or not receiving the control signal, and then when transmission occurred, for generating a first recording signal to record a transmission time of the control signal, which corresponds to the clock signal, when the control signal has been transmitted, for judging whether or not the air bag has been expanded by whether or not it received the air bag expansion sensing signal from the air bag sensor for generating a second recording signal to record an expansion time of the air bag which corresponds to the clock signal when expansion occurred; and a memory section for memorizing data concerning the expansion of the air bag by receiving the first and second recording signals from the control means.

Preferably, the first recording signal is a signal for recording a transmission time of the control signal when the control signal has been normally transmitted from the control means and for recording an error of the air bag system when the control signal has not been normally transmitted from the control means. The second recording signal is a signal for recording an expansion time of the air bag when the air bag has normally expanded and for recording an error of the air bag system when the air bag has not been normally expanded. The memory section is comprised of an electrically erasable and programmable read only memory device, and the air bag sensor is comprised of a pressure sensing sensor.

According to the preferable embodiment of the present invention, the air bag sensor is provided between the air bag and the inflator. Also, the air bag sensor may be provided in the air bag.

The second object of the present invention may be accomplished by providing an air-bag system for recording an operation state and an operation time of modules of an air bag system for a motor vehicle, which comprises:

a collision sensing sensor for generating a collision sensing signal by sensing a collision of the motor vehicle;

an air bag module having an inflator including a squib section which ignites and a reaction device for generating a gas by exploding a powder by the ignition of the squib section, an inflatable air bag which inflates by the injection of the gas, and an air bag sensor, which is provided at a predetermined position on the air bag, for sensing an expansion operation of the air bag to output an air bag expansion sensing signal, the squib section having a first sensor for transmitting a squib section operation sensing signal, and the reaction device having a second sensor for transmitting a reaction device operating sensing signal at an output side of the reaction device;

a clock generating section for generating a clock signal to record time;

a control means for receiving the collision sensing signal, for transmitting a control signal to ignite the squib section, for judging whether or not the control signal has been transmitted by whether or not it received the control signal, for generating a first recording signal to record a transmission time of the control signal which corresponds to the clock signal when the control signal has been transmitted, for judging whether or not the squib section had operated by whether or not it received the squib section operation sensing signal from the first sensor, for generating a second recording signal to record an operation time of the squib section which corresponds to the clock signal when the squib section operation sensing has been transmitted, for judging whether or not the reaction device had operated by whether or not it received the reaction device operation sensing signal from the second sensor, for generating a third recording signal to record an operation time of the reaction device which corresponds to the clock signal when the reaction device operation sensing signal has been transmitted, for judging whether or not the air bag had expanded by receiving the air bag expansion sensing signal from the air bag sensor, and for generating a fourth recording signal to record an expansion time of the air bag which corresponds to the clock signal when the air bag expansion sensing signal has been transmitted; and a memory section for memorizing data concerning an operation state and an operation time of modules in the air bag system by receiving the first, second, third, and the fourth recording signals from the control means.

The first recording signal is a signal for recording a transmission time of the control signal when the control signal has been normally transmitted from the control means and for recording an error of the air bag system when the control signal has not been normally transmitted from the control means. The second recording signal is a signal for recording an operation time of the squib section when the squib section had normally operated and for recording an error of the air bag system when the squib section had not normally operated. The third recording signal is a signal for recording an operation time of the reaction device when the reaction device had normally operated and for recording an error of the air bag system when the reaction device had not normally operated. The fourth recording signal is a signal for recording an expansion time of the air bag when the air bag had normally expanded and for recording an error of the air bag system when the air bag had not normally expanded.

Preferably, the memory section is comprised of an electrically erasable and programmable read only memory device, the first sensor is comprised of a heat sensing sensor, the second sensor is comprised of a pressure sensing sensor, and the air bag sensor is comprised of a pressure sensing sensor.

As it is described above, in the air bag system according to the present invention, the passenger in the vehicle having the air bag system is able to know whether or not the modules of the air bag system had correctly operated within a set time after the air bag expanded because of collision of the motor vehicle. Consequently, the air bag system according to the present invention gives the trust to the user.

BRIEF DESCRIPTION OF THE DRAWINGS

The above objects and other advantages of the present invention will become more apparent by describing in detail the preferred embodiments thereof with reference to the attached drawings, in which.

DESCRIPTION OF THE PREFERRED EMBODIMENT

Hereinbelow, the preferable embodiments of the present invention will be described with reference to the accompanying drawings in detail.

Embodiment 1

Figure 1:
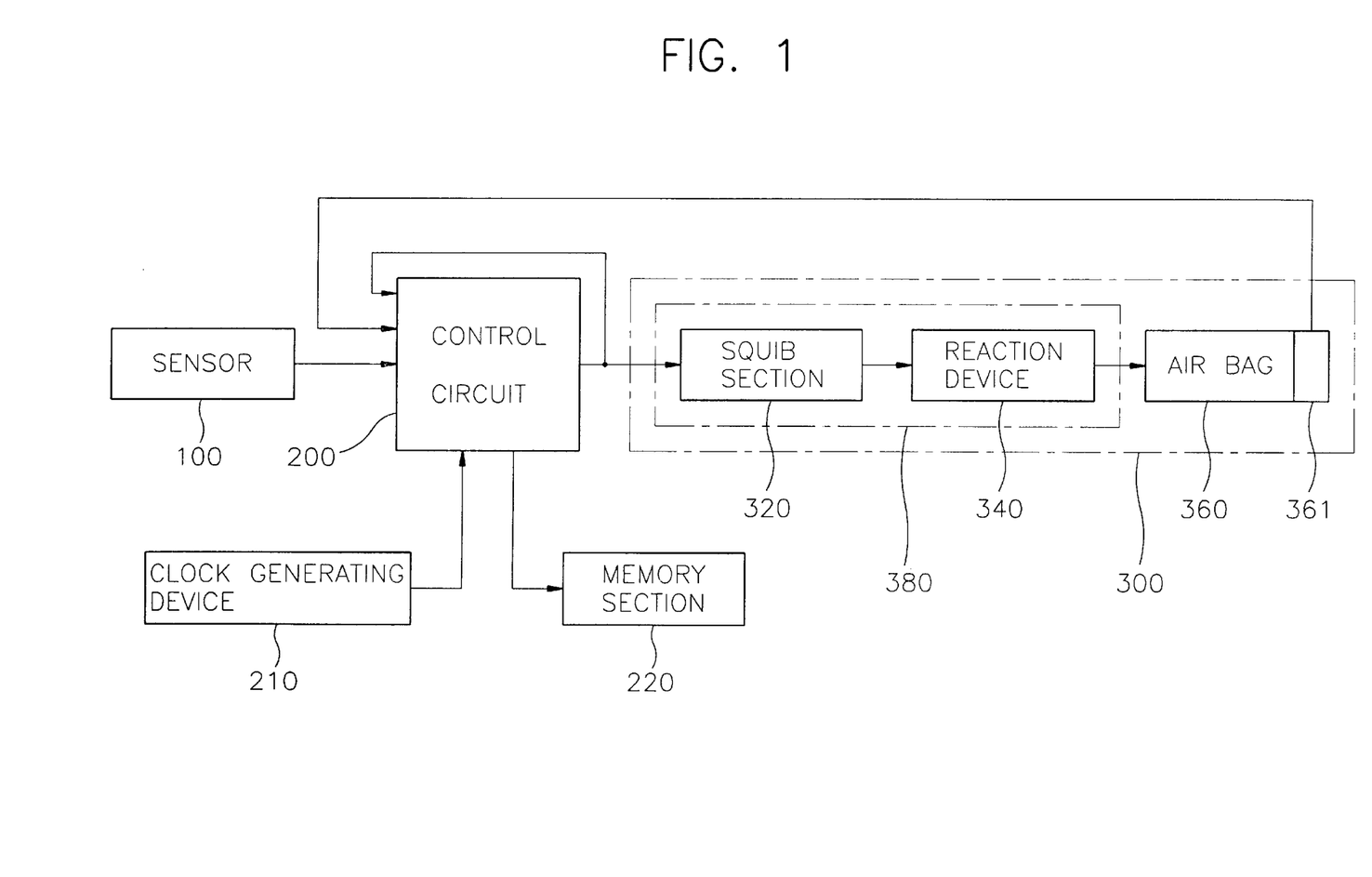
FIG. 1 is a schematic view of an air bag system according to the first embodiment of the present invention.

FIG. 1 is a schematic view of an air bag system according to the first embodiment of the present invention. Referring to FIG. 1, a collision sensing sensor 100 which senses a collision of the motor vehicle is coupled to a control circuit 200. Control circuit 200 controls all operations for protecting a passenger by inflating the air bag during a collision of the motor vehicle. Control circuit 200 is electrically coupled to an air bag module 300. Control circuit 200 is electrically coupled to a clock generating section 210 which generates a clock signal, and a memory section 220 for storing predetermined data is therein. Memory section 220 is preferably comprised of an electrically erasable and programmable read only memory (EEPROM) device wherein the storing of data and the deleting of recorded data can be easily performed. Air bag module 300 has a folded air bag 360 arranged in a container, and an inflator 380 which is fixed to the container. Inflator 380 has a squib section 320 which is ignited by receiving a control signal transmitted from control circuit 200, and a reaction device 340 which generates a gas to expand air bag 330 by ignition of squib section 320.

That is, collision sensing sensor 100 and clock generating section 210 are coupled to control circuit 200 so as to input data therein. Memory section 220 stores the data transmitted from control circuit 200. The output side of control circuit 200 is coupled to air bag module 300. Air bag module 300 has an air bag 360 and an inflator 380. Inflator 380 has squib section 320, which is ignited by a control signal transmitted from control circuit 200 and reaction device 340. Reaction device 340 generates gas by the explosion of a powder and is coupled to the output side of squib section 320, which is ignited by receiving the control signal transmitted from control circuit 200. The gas which has been generated in inflator 380 is injected into air bag 360 via a plurality of gas distribution nozzles. Then, as the gas fills up air bag 360, air bag 360 penetrates the fragile portion of the container so that air bag 360 is expanded toward the front of the passenger in the vehicle. Air bag 360 is positioned folded in the container in an irregular form. When the air bag expands, the air bag comes into contact with the passenger.

In the present embodiment, control circuit 200 controls the operation which is needed for the expansion of the air bag after receiving the collision sensing signal from collision sensing sensor 100. Control circuit 200 measure the time from when control circuit 200 judges that the expansion of the air bag is necessary by receiving the first collision signal, and stores the transmission (or outputted) time of the control signal and the expansion time of the air bag 360 into memory section 220. Air bag 360 includes an air bag sensor 361 to sense the expansion operation of air bag 360. For example, air bag sensor 361 is comprised of a pressure sensing sensor which senses the pressure of the gas which is injected into air bag 360. Air bag sensor 361 may be placed in air bag 360 or between air bag 360 and inflator 380. Air bag sensor 361 senses the expansion operation of air bag 360, and inputs the air bag expansion sensing signal into control circuit 200. After receiving the air bag expansion sending signal from air bag sensor 361, control circuit 200 records the data related to the operation time of air bag 360 in memory section 220. In general, the time from the first collision sensing point to the output of the control signal from the control circuit 200 and the complete expansion of air bag 360 must be less than 0.04 second. In the present embodiment, the time is measured from the collision sensing point to the moment when the control signal is outputted from control circuit 200, and to the moment when air bag 360 is expanded, and is recorded in memory section 220.

Hereinafter, the operation of the air bag system according to this embodiment is explained referring to FIG. 2.

Figure 2:
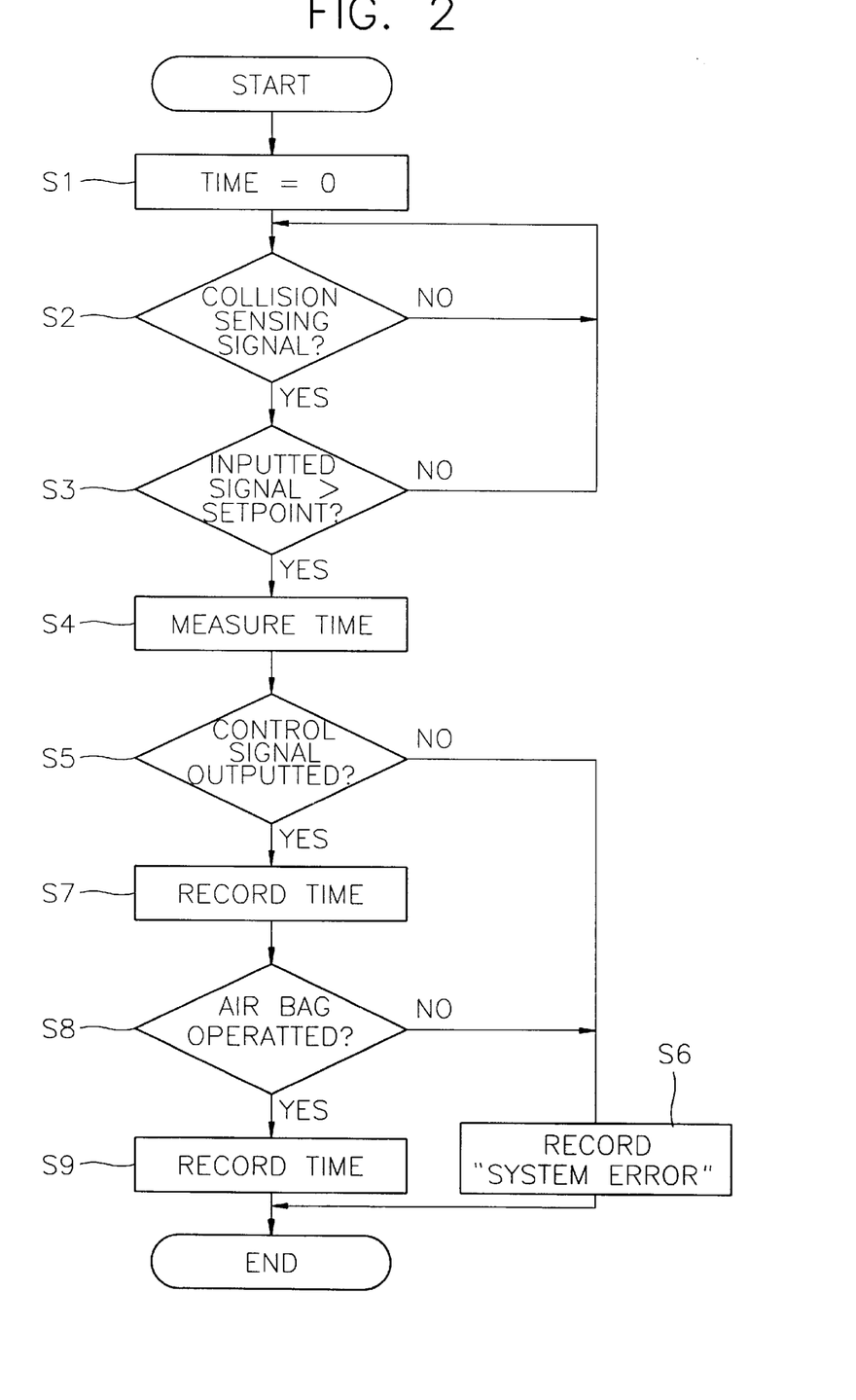
FIG. 2 is a flow chart for showing the operation of an air bag system as shown in FIG. 1.

FIG. 2 is a flow chart for showing operation of an air bag system as shown in FIG. 1. As shown as FIG. 2, in the air bag system according to this embodiment, control circuit 200 initializes time of clock generating section 210 (step S1). After step S1, control circuit 200 judges whether or not the collision sensing signal has been inputted from collision sensing sensor 100 (step S2). If the collision sensing signal has been inputted from collision sensing sensor 100 in step S2, control circuit 200 judges whether or not the air bag should be expanded by comparing the inputted collision sensing signal is with a preset signal. That is, control circuit 200 judges whether or not the collision sensing signal transmitted from collision sensing sensor 100 is more than a preset point. In step S3, if the collision sensing signal transmitted from collision sensing sensor 100 is more than the preset value, collision circuit 200 applies an air bag operating starting signal to air bag module 300. At the same time, control circuit 200 applies a signal to measure time to the clock generating section 210 (step S4). After step S4, control circuit 200 judges whether or not the air bag operating starting signal has been transmitted from control circuit 200 (step S5). In the above-step, the output side of control circuit 200 is electrically coupled to air bag module 300 and is also coupled to the input side of control circuit 200 in order to judge whether or not the air bag operating starting signal has been normally transmitted from control circuit 200. In step S5, if the air bag operating starting signal has not been outputted from control circuit 200, control circuit 200 generates a data signal which shows a "system error" in the air bag system as a first recording signal, and records the data in memory section 220 (step S6). In step S5, if the air bag operating starting signal has been normally outputted from control circuit 200, control circuit 200 generates a data signal which shows the transmission time (with respect to the initialized time) of the control signal in the air bag system as a first recording signal, and records the data in memory section 220 (step S7). In step S5, if the control signal transmitted from control circuit 200 has been applied to squib section 320 in air bag module 300, then squib section 320 is ignited. If squib section 320 is ignited, reaction device 340 generates an inert gas such as nitrogen ($N_2$) or argon (Ar) for injection into air bag 360 by a powder explosion. The gas generated in reaction device 340 is injected into air bag 360 through the gas distribution nozzles (not-shown). Air bag 360 is instantaneously expanded by the gas injected from inflator 380. At this time, air bag sensor 361 senses is the pressure level of the gas injected into air bag 360 and sends a data signal to control circuit 200. Air bag sensor 361 may be disposed either between inflator 380 and air bag 360 or in air bag 360 in such a manner that it can easily sense the pressure level of the gas. Control circuit 200 judges whether or not air bag 360 has normally operated by means of the data transmitted from air bag sensor 361 (step S8). In step S8, if control circuit 200 judges that air bag 360 has not normally operated, control circuit 200 generates a data signal which shows "a system error" in the air bag system as a second recording signal, and then records this signal in memory section 220 by performing step S6. That is, when the level of gas pressure flowing into air bag 360 is neither enough to protect the passenger nor is higher than the normal pressure so as to injure the passenger, control circuit 200 performs step S6. In step S8, if control circuit 200 judges that air bag 360 has normally operated, control circuit 200 generates a data signal to record the expansion time of air bag 360 as a second recording signal, and control circuit 200 applies the second recording signal to memory section 220 and stores the second recording signal in memory section 220 (step S9). Accordingly, memory section 220 stores the data which shows the transmission time of the control signal from control circuit 200, the expansion time of the air bag, and the error of the air bag system.

In this embodiment, the operation states and the operation times of the essential modules for operating the air bag system, namely, the control circuit and the air bag, are recorded in the memory section. When the air bag system did not correctly operate at the moment of the vehicle's collision, the user is able to confirm that responsibility lies in the manufacturer by using the data recorded in the memory section.

Embodiment 2

In Embodiment 1, only the operation state and the operation time of the essential modules in the air bag system are recorded. The air bag system in embodiment 1 has a simple constitution. In this Embodiment, an air bag system which records the operation state and the operation time of each of the modules in the air bag system and thus improves the trustworthiness of the air bag system, is described.

Figure 3:
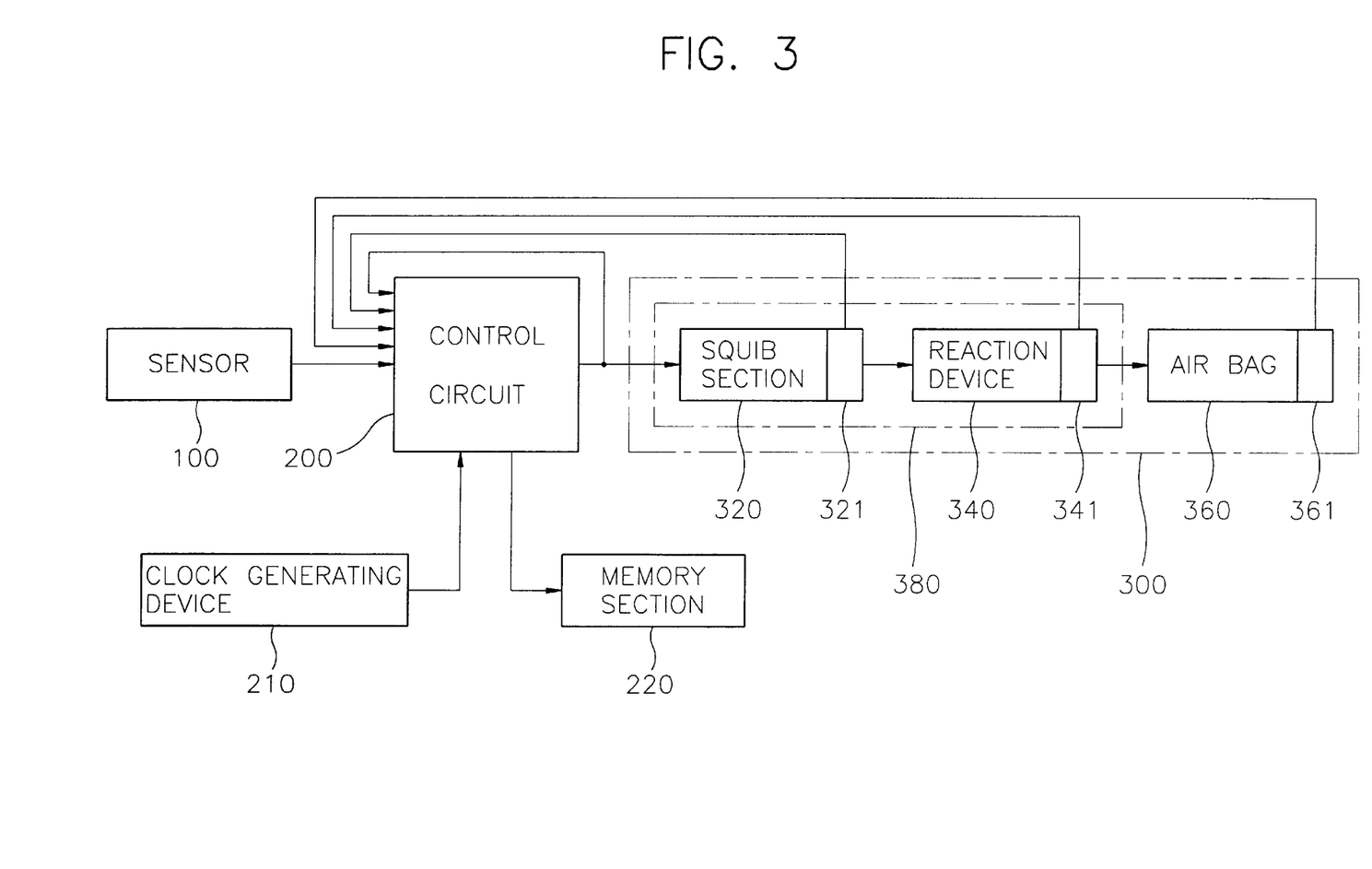
FIG. 3 is a schematic view of an air bag system according to the second embodiment of the present invention.

FIG. 3 is a schematic view of an air bag system according to the present embodiment. In FIG. 3, the same reference numerals are used concerning the same elements in FIG. 1. The apparatus for recording the operating time of the air bag system of the present embodiment is the same as the apparatus for recording the operating time of the air bag system of Embodiment 1, except that in Embodiment 2, there is a first sensor 321 which outputs a squib section operation sensing signal to sense the operation of squib section 320 and is provided at squib section 320 in inflator 380, and a second sensor 341 which outputs a reaction device operation sensing signal to sense the operating of reaction device 340 and is provided at reaction device 340 in inflator 380, and that these first and second sensor 321 and 341 are electrically connected to the input side of control circuit 200.

In the present embodiment, the operation state and the operating time of each of the modules in the air bag system are transmitted to control circuit 200, and are then stored in memory section 220. In the present embodiment, first sensor 321, second sensor 341 and air bag sensor 361 are respectively provided at each of the modules in the air bag system. First sensor 321 is provided at squib section 320 in inflator 380.

First sensor 321 is a heat sensing sensor to sense variations in the heat at the point of the ignition of the squib section. Second sensor 341 is provided at the output side of reaction device 340 in inflator 380. Second sensor 321 is a pressure sensing sensor which senses the pressure level of the gas. Air bag sensor 361 is provided at air bag 360. Air bag sensor 361 is a pressure sensing sensor. First sensor 321, second sensor 341 and air bag sensor 361 are connected to the input side of control circuit 200. First sensor 321 sends a squib section operation sensing signal to control circuit 200, which senses the operation state of squib section 320. Second sensor 341 sends an reaction device operation sensing signal to control circuit 200, which senses the operation state of reaction device 340. Air bag sensor 360 sends an air bag expansion sensing signal to control circuit 200, which senses the expansion operation of air bag 360. Consequently, control circuit 200 records in memory section 220 data showing the transmission state and the transmission time of the control signal, the operation state and the operation time of squib section 320, and the operation state and the operation time of reaction device 340.

Hereinafter, the operation of the air bag system according to present embodiment is explained with reference to FIGS. 4A and 4B.

Figure 4A:
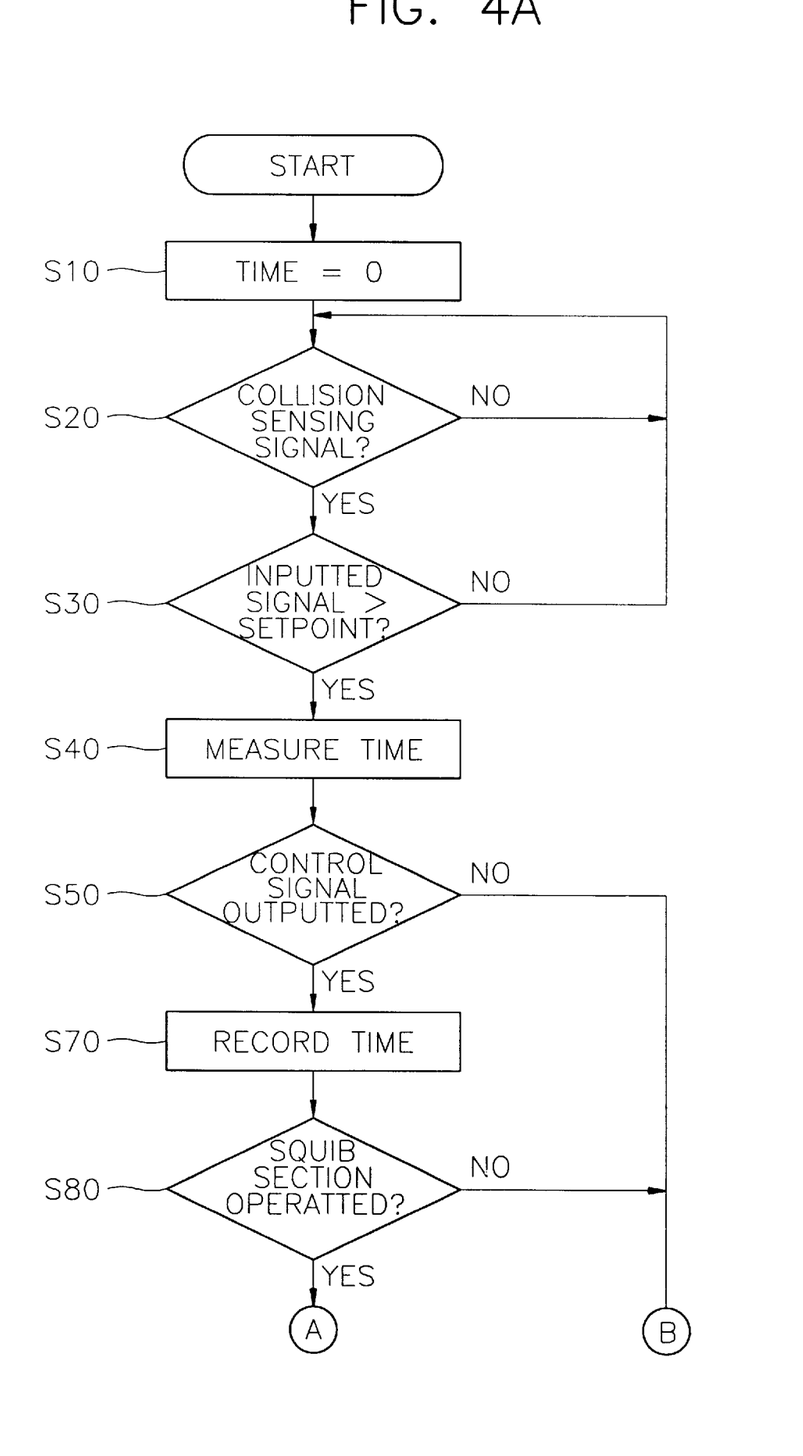
FIGS. 4A and 4B is a flow chart for showing the operation of an air bag system as shown in FIG. 3.
Figure 4B:
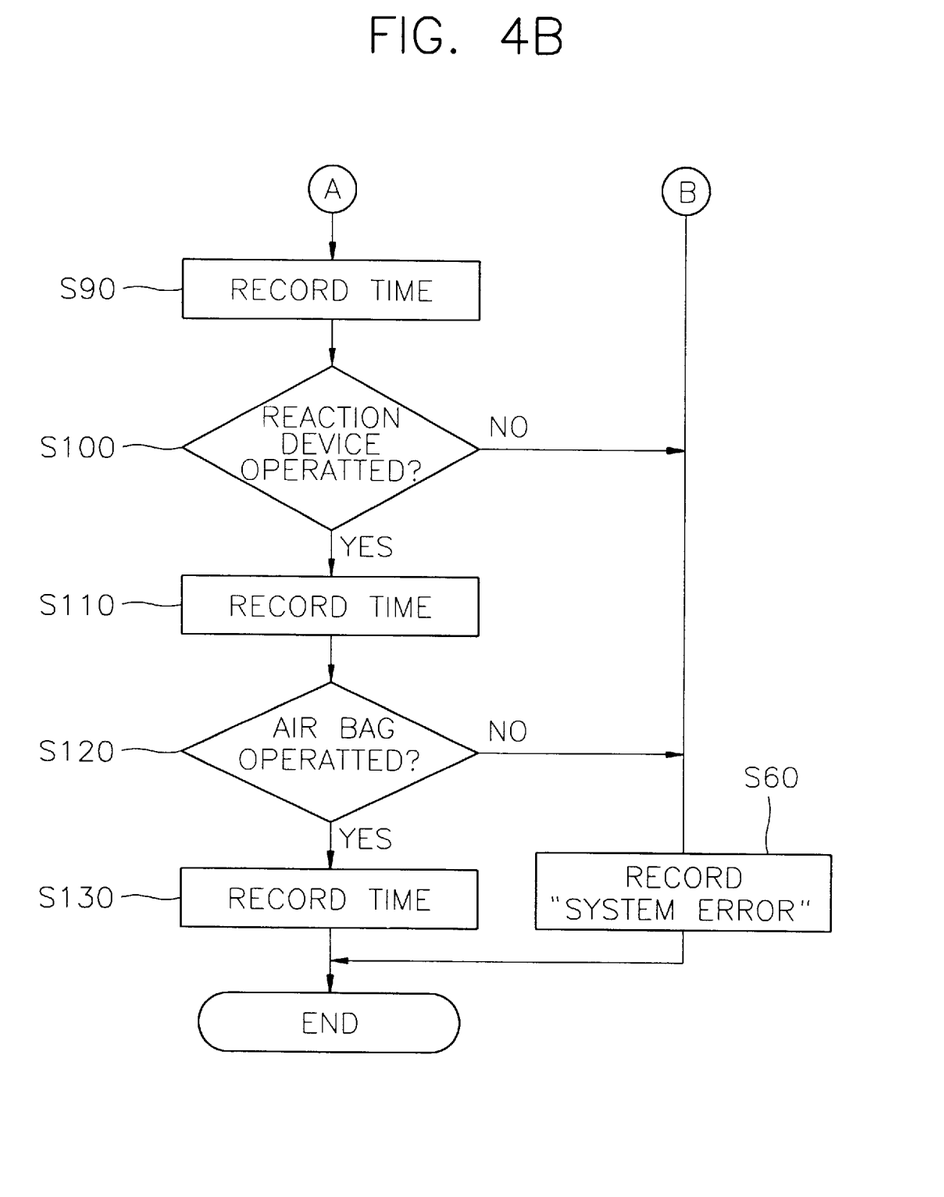

FIGS. 4A and 4B is a flow chart for showing the operation of the air bag system shown in FIG. 3. As shown in FIG. 4, the operation from step S10 to step S50 in the air bag system according to the present embodiment is the same as in the operation from step S1 to step S5 in Embodiment 1. In step S50, if the air bag operating starting signal has not been transmitted from control circuit 200, then control circuit 200 generates data of a "system error" in the air bag system as a first recording signal, and records the data in memory section 220 (step S60). In step S50, if the air bag operating starting signal has been normally transmitted from control circuit 200, then control circuit 200 generates data of the transmission time of the control signal in the air bag system as a first recording signal, and records the data in memory section 220 (step S70).

In step S50, if the control signal transmitted from control circuit 200 is applied to air bag module 300, the squib section 320 in the inflator 380 is ignited. First sensor 321 which is provided at the squib section 320, sends a signal by sensing the heat generated at the ignition time to control circuit 200. From the transmitted data from first sensor 321, control circuit 200 judges the operation state of squib section 320 (step S80). In step S80, if control circuit 200 judges that squib section 320 had not normally operated, control circuit 200 generates data of a "system error" in the air bag system as a second recording signal, and records the data in memory section 220 (step S60). In step S80, if the control circuit 200 judges that squib section 320 had normally operated, control circuit 200 generates data which show the operation time of squib section 320 as a second recording signal, and records the data in memory section 220 (step S90). In the above-step, when squib section 320 is ignited, reaction device 340 generates an inert gas such as nitrogen $N_2$ or argon Ar which is to be injected into air bag 360 by a chemical reaction. The gas generated in reaction device 340 is injected into air bag 360. Second sensor 341 is coupled to the output side of reaction device 340. The second sensor 341 senses the pressure level of the gas flowing into the air bag 360 from the reaction device 340. From the sensing of second sensor 341, control circuit 200 judges whether or not reaction device 340 had normally operated. In other words, control circuit 200 judges whether or not the gas had normally flowed from inflator 380 into air bag 360 from the transmitted data of second sensor 341 which is provided at reaction device 340 (step S100). In step S100, when control circuit 200 judges that the gas had not normally flowed into air bag 360, control circuit 200 generates data of a "system error" in the air bag system as a third recording signal, and records the data in memory section 220 (step S60). In the step S100, if control circuit 200 judges that the gas had normally flowed into the air bag 360, the control circuit 200 generates data of the operation time of reaction device 340 as a third recording signal, and records the data in memory section 220 (step S120). Under normal operation, inflator 380 generates an inert gas which is injected into air bag 360 by a chemical reaction. Air bag 360 is instantaneously expanded by the gas injected from inflator 380. At this time, air bag sensor 361 senses the pressure level of the gas injected into air bag 360 and sends a signal to control circuit 200. Control circuit 200 judges whether or not air bag 360 had normally operated from the data transmitted from air bag sensor 361 (step S120). In step S120, if control circuit 200 judges that air bag 360 had not normally operated, control circuit 200 generates data of a "system error" in the air bag system as a fourth recording signal as step S60. In the step S80, if control circuit 200 judges that air bag 360 had normally operated, control circuit 200 generates data recording the expansion time of air bag 360 as a fourth recording signal, and control circuit 200 applies the fourth recording signal to memory section 220 and stores the fourth recording signal in memory section 220 (step S130). After completion of the above-steps, memory section 220 stores the data showing the operation state and the operation time of each of the modules in the air bag system.

Consequently, by using the air bag system according to present embodiment, since the operation state and the operation time of each of the modules in the air bag system are recorded, the second embodiment secures more of the user's trust.

According to the present invention, the operation state and the operation time of the modules in the air bag system are recorded to improve the trust of the user. When the air bag system did not normally operate during the vehicle's collision, the user is able to claim for damages to the manufacturer of the air bag system. Therefore, the air bag system according to this invention is able to secure the trust of the user in the air bag system.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that resides in the present invention, including all the features that would be treated as equivalents thereof by those skilled in the art to which this pertains.

What is claimed is:

1. A method for recording an operation state and an operation time of an air bag system for a motor vehicle, said method comprising the steps of:

(i) setting a time to zero and judging whether or not a collision sensing signal is inputted;

(ii) comparing the collision sensing signal with a set point when the collision sensing signal has been inputted in step (i) and generating a control signal to operate an air bag while measuring the time of transmission of a collision sensing signal having a value greater than the set point;

(iii) judging whether or not the control signal has been normally generated;

(iv) recording a first system error to a memory section when the control signal has not been normally generated and recording a generated time of the control signal to the memory section when said control signal has been normally generated in step (iii);

(v) judging whether or not the air bag has been normally expanded; and (vi) recording a second system error to the memory section when the air bag has not normally expansion and recording an expanded time of the air bag to the memory section when the air bag has been normally expanded in step (v).

2. A method as claimed in claim 1, wherein the generated control signal is returned as an input signal to judge whether or not the control signal has been generated in step (iii).

3. A method as claimed in claim 1, wherein a pressure level of a gas injected into the air bag is measured to judge whether or not said air bag has normally expanded in step (v).

4. A method for recording an operation state and an operation time of an air bag system for a motor vehicle, said method comprising the steps of:

(i) setting a time to zero and judging whether or not a collision sensing signal is inputted;

(ii) comparing the collision sensing signal with a set point when the collision sensing signal has been inputted in step (i) and generating a control signal to operate an air bag while measuring the time of the transmission of a collision sensing signal having a value greater than the set point;

(iii) judging whether or not the control signal has been normally generated;

(iv) recording a first system error to a memory section when the control signal has not been normally generated and recording a generated time of the control signal when said control signal has been normally generated in step (iii);

(v) judging whether or not a gas to be injected into the air bag has normally generated;

(vi) recording a second system error to the memory section when the gas has not been normally generated and recording a generated time of the gas to the memory section when the gas has been normally generated in step (v);

(vii) judging whether or not the gas has been normally injected into the air bag;

(viii) recording a third system error to the memory section when the gas has not been normally injected into the air bag and recording an injection time of the gas when the gas has been normally injected into the air bag in step (vii);

(ix) judging whether or not the air bag has normally expanded; and (x) recording a fourth system error when the air bag has not normally expanded and recording an expanded time of the air bag when the air bag has normally expanded in step (ix).

5. A method as claimed in claim 4, wherein a heat generated during generation of the gas is sensed to judge whether or not the gas to be injected into the air bag has been normally generated in step (v).

6. A method as claimed in claim 4, wherein a variation of a pressure level of the gas to be injected is sensed to judge whether or not the gas has been normally injected into the air bag at step (vii).

7. An air bag system for recording an operation state and an operation time of modules of an air bag system for a motor vehicle, which comprises:

a collision sensing sensor for generating a collision sensing signal by sensing a collision of the motor vehicle;

an air bag module having an inflator including a squib section which ignites and a reaction device for generating a gas by exploding a powder by the ignition of said squib section, an inflatable air bag which inflates by the injection of the gas, and an air bag sensor which is provided at a predetermined position on said air bag, for sensing an expansion operation of said air bag and outputting an air bag expansion sensing signal;

a clock generating section for generating a clock signal to record time;

a control means for receiving the collision sensing signal, for generating a control signal to ignite said squib section, for judging whether or not the control signal has been transmitted by either receiving or not receiving the control signal, and then when a transmission occurred, for generating a first recording signal to record a transmission time of the control signal, which corresponds to the clock signal, when said control signal has been transmitted, for judging whether or not said air bag has been expanded by whether or not it received the air bag expansion sensing signal from said air bag sensor for generating a second recording signal to record an expansion time of said air bag which corresponds to the clock signal when an expansion occurred; and a memory section for memorizing data concerning the expansion of said air bag by receiving said first and second recording signals from said control means.

8. An air bag system as claimed in claim 7, wherein said first recording signal is a signal for recording a transmission time of the control signal when the control signal has been normally transmitted from said control means and for recording an error of the air bag system when the control signal has not been normally transmitted from said control means.

9. An air bag system as claimed in claim 7, wherein said second recording signal is a signal for recording an expansion time of said air bag when said air bag has normally expanded and for recording an error of said air bag system when said air bag has not been normally expanded.

10. An air bag system as claimed in claim 7, wherein said memory section is comprised of an electrically erasable and programmable read only memory device.

11. An air bag system as claimed in claim 7, wherein said air bag sensor is comprised of a pressure sensing sensor.

12. An air bag system as claimed in claim 7, wherein said air bag sensor is provided between said air bag and said inflator.

13. An air bag system as claimed in claim 7, wherein said air bag sensor is provided in the air bag.

14. An air bag system for recording an operation state and an operation time of modules of an air bag system for a motor vehicle, which comprises:

a collision sensing sensor for generating a collision sensing signal by sensing a collision of the motor vehicle;

an air bag module having an inflator including a squib section which ignites and a reaction device for generating a gas by exploding a powder by the ignition of said squib section, an inflatable air bag which inflates by the injection of the gas, and an air bag sensor, which is provided at a predetermined position on said air bag, for sensing an expansion operation of said air bag to output an air bag expansion sensing signal, said squib section having a first sensor for transmitting a squib section operation sensing signal, and said reaction device having a second sensor for transmitting a reaction device operating sensing signal at an output side of said reaction device;

a clock generating section for generating a clock signal to record time;

a control means for receiving the collision sensing signal, for transmitting a control signal to ignite said squib section, for judging whether or not said control signal has been transmitted by whether or not it received said control signal, for generating a first recording signal to record a transmission time of said control signal which corresponds to said clock signal when said control signal has been transmitted, for judging whether or not said squib section had operated by whether or not it received said squib section operation sensing signal from said first sensor, for generating a second recording signal to record an operation time of said squib section which corresponds to said clock signal when said squib section operation sensing has been transmitted, for judging whether or not said reaction device had operated by whether or not it received said reaction device operation sensing signal from said second sensor, for generating a third recording signal to record an operation time of said reaction device which corresponds to said clock signal when said reaction device operation sensing signal has been transmitted, for judging whether or not said air bag had expanded by receiving said air bag expansion sensing signal from said air bag sensor, and for generating a fourth recording signal to record an expansion time of said air bag which corresponds to said clock signal when said air bag expansion sensing signal has been transmitted; and a memory section for memorizing data concerning an operation state and an operation time of modules in the air bag system by receiving the first, second, third, and fourth recording signals from said control means.

15. An air bag system as claimed in claim 14, wherein the first recording signal is a signal for recording a transmission time of the control signal when the control signal has been normally transmitted from said control means and for recording an error of the air bag system when the control signal has not been normally transmitted from said control means.

16. An air bag system as claimed in claim 14, wherein said second recording signal is a signal for recording an operation time of said squib section when said squib section had normally operated and for recording an error of the air bag system when said squib section had not normally operated.

17. An air bag system as claimed in claim 14, wherein the third recording signal is a signal for recording an operation time of said reaction device when said reaction device had normally operated and for recording an error of the air bag system when said reaction device had not normally operated.

18. An air bag system as claimed in claim 14, wherein said fourth recording signal is a signal for recording an expansion time of said air bag when said air bag had normally expanded and for recording an error of said air bag system when said air bag had not normally expanded.

19. An air bag system as claimed in claim 14, wherein said memory section is comprised of an electrically erasable and programmable read only memory device.

20. An air bag system as claimed in claim 14, wherein said first sensor is comprised of a heat sensing sensor.

21. An air bag system as claimed in claim 14, wherein said second sensor is comprised of a pressure sensing sensor.

22. An air bag system as claimed in claim 14, wherein said air bag sensor is comprised of a pressure sensing sensor.

* * * * *